United States Patent [19]
Zornes et al.

[11] Patent Number: 5,813,248
[45] Date of Patent: Sep. 29, 1998

[54] BALANCED ADSORBENT REFRIGERATOR

[76] Inventors: David A. Zornes, 4343 202$^{nd}$ Ave. Northeast, Redmond, Wash. 98053; John J. Bauer, 44714 SE. 161$^{st}$ Pl., North Bend, Wash. 98045

[21] Appl. No.: 742,387
[22] Filed: Nov. 1, 1996

Related U.S. Application Data

[60] Provisional application No. 60/010,335 Nov. 1, 1995.
[51] Int. Cl.$^6$ .................................................. F25B 17/08
[52] U.S. Cl. ................................. 62/480; 62/106; 165/81
[58] Field of Search ............................ 62/480, 476, 101, 62/102, 106, 112, 477; 252/69; 165/81

[56] References Cited

U.S. PATENT DOCUMENTS

| | | | |
|---|---|---|---|
| 2,338,712 | 1/1944 | Erland Af Kleen | 62/480 |
| 2,393,245 | 1/1946 | Hadsell | 62/457.7 |
| 2,410,334 | 10/1946 | Brace | 62/5 |
| 2,496,459 | 2/1950 | Erland Af Kleen | 62/480 |
| 2,528,004 | 10/1950 | Erland af Kleen | 62/5 |
| 3,126,348 | 3/1964 | Meijer | 252/67 |
| 3,319,416 | 5/1967 | Renshaw | 60/24 |
| 3,925,041 | 12/1975 | Patterson et al. | 55/267 |
| 4,034,569 | 7/1977 | Tchernev | 62/2 |
| 4,138,850 | 2/1979 | Tchernev | 60/641 |
| 4,191,019 | 3/1980 | Bratt et al. | 60/525 |
| 4,199,945 | 4/1980 | Finkelstein | 60/520 |

(List continued on next page.)

FOREIGN PATENT DOCUMENTS

| | | |
|---|---|---|
| 1 029 877 | 6/1953 | France . |
| 1 012 133 | 7/1957 | Germany . |
| 3413349 | 10/1985 | Germany . |
| 3425419 | 1/1986 | Germany . |
| 3604909 | 8/1987 | Germany . |
| 44 03 360 A | 8/1995 | Germany . |
| 59-56067 | 3/1984 | Japan . |
| 59-56068 | 3/1984 | Japan . |
| 1 528 118 | 10/1978 | United Kingdom . |

OTHER PUBLICATIONS

"Company Profile," Zeo–Tech GmbH, Unterschleissheim, Germany, 1995 (2 pages).

Schwarz et al., "Cooling and Air Conditioning with Water/Zeolite," Zeo–Tech GmbH, Unterschleissheim, Germany. 1995, pp. 1–12.

Schwarz and Müller, "Solar Powered Refrigerator," Zeo–Tech GmbH, Unterschleissheim, Germany, 1995, preface + pp. 1–6.

Müller and Schwarz, "Zeolite Cool–Boiler," Zeo–Tech GmbH, Unterschleissheim, Germany, 1995, preface + pp. 1–4.

Schwarz, "Zeolite Technology —Alternative to Alternatives," International CFC and Halon Alternatives Conference, Washington, D.C., Oct. 23–25, 1995, pp. 1–10.

Schwarz and Wagner, "Deep Freezer and Refrigerated Trolleys on the Basis of Water/Zeolite Adsorption Systems," *Sci. Tech. Froid.* 1:541–550, 1994 (plus Chem. Abstr. 123:166408, 1994).

(List continued on next page.)

*Primary Examiner*—William Doerrler
*Attorney, Agent, or Firm*—Seed and Berry LLP

[57] ABSTRACT

A heat transfer apparatus that uses an adsorbent material to generate a cooling effect. The heat transfer apparatus includes a first vessel containing adsorbent material and a second vessel interconnected to the first. A working substance is contained within the two interconnected vessels. The adsorbent material and working substance are sized such that the working substance is completely adsorbed in both liquid and solid states by the adsorbent material from the second vessel into the first, cooling the second vessel and heating the first. Complete adsorption includes adsorption of the working substance by vaporization when the working substance is in a liquid phase and adsorption by sublimation when the working substance is in a solid phase. The second vessel contains a compressible foam which accommodates the expansion of the working substance when it changes phase from a liquid to a solid and prevents the second vessel from breaking.

40 Claims, 11 Drawing Sheets

U.S. PATENT DOCUMENTS

| | | |
|---|---|---|
| 4,205,531 | 6/1980 | Brunberg et al. .......................... 62/101 |
| 4,250,720 | 2/1981 | Siegel ........................................ 62/480 |
| 4,276,440 | 6/1981 | Cannelli .................................. 136/206 |
| 4,357,809 | 11/1982 | Held et al. ................................. 62/457 |
| 4,556,049 | 12/1985 | Tchernev .................................. 126/429 |
| 4,584,842 | 4/1986 | Tchernev ................................... 62/106 |
| 4,637,218 | 1/1987 | Tchernev ................................... 62/106 |
| 4,752,310 | 6/1988 | Maier-Laxhuber et al. .................. 62/4 |
| 4,759,191 | 7/1988 | Thomas et al. ............................ 62/101 |
| 4,816,121 | 3/1989 | Keefer ..................................... 204/156 |
| 4,924,676 | 5/1990 | Maier-Laxhuber et al. ................ 62/59 |
| 4,996,029 | 2/1991 | Martin et al. ............................ 422/188 |
| 5,025,635 | 6/1991 | Rockenfeller et al. .................... 62/106 |
| 5,038,581 | 8/1991 | Maier-Laxhuber et al. ........... 62/457.9 |
| 5,113,666 | 5/1992 | Parrish et al. .......................... 62/259.3 |
| 5,237,827 | 8/1993 | Tchernev ................................... 62/106 |
| 5,251,458 | 10/1993 | Tchernev ................................... 62/271 |
| 5,339,639 | 8/1994 | Garrett ........................................ 62/6 |
| 5,396,775 | 3/1995 | Rockenfeller et al. .................... 62/112 |
| 5,415,012 | 5/1995 | Maier-Laxhuber et al. .............. 62/269 |
| 5,456,076 | 10/1995 | Zornes ...................................... 60/525 |
| 5,522,228 | 6/1996 | Guillot et al. ............................ 62/101 |

OTHER PUBLICATIONS

Chem. Abstr. 123:36104, 1994: Schwarz, "Refrigeration of Food in Passenger Trains with Water/Zeolite Adsorption Systems," *Ki Luft–und Kältetechnik* 3(11):536–540, 1994, with English abstract.

Chem. Abstr. 123:16344, 1994: Gentner et al., "Zeolite/Water or R134a for Automobile Air Conditioning?" *Ki Luft–und Kältetechnik* 30(6):288–293, 1994.

Chem. Abstr. 122:59215, 1993: Gentner et al., "Cold Vapor Engine and Adsorption Cooling Aggregate for Vehicle Air Conditioning," *DKV–Tagunggber.* 2(1):245–266, 1993.

Suzuki, "Application of Adsorption Cooling Systems to Automobiles," *Heat Recovery Systems & CHP* 13(4):335–340, 1993.

Chem. Abstr. 119:164014, 1992 (abstract only): Hoeppler, "Natural Zeolite–Water Sorption Cooling Installation for Air Condition of Vehicles," *DKV–Statusber. Dtsch. Kaelte–Klimatech. Ver.* 10:19–23, 1992.

Chem. Abstr. 119:51996, 1991 (abstract only): Hoeppler, "Sorption Cooler for Vehicle Air Conditioning with Zeolite and Water," *DKV–Statusber. Dtsch. Kaelte–Klimatech. Ver.* 7:31–35, 1991.

Chem. Abstr. 119:51903, 1991 (abstract only): Schwarz, "Sorption Technique—Alternative to the Alternatives," *Ki Luft–Kaeltetech.* 27(3):127–132, 1991.

Chem. Abstr. 118:41395, 1991 (abstract only): Schwarz et al., "Adsorption System with Water/Zeolite Pair," *DKV–Tagungsber.* 2(1):203–216, 1991.

Product Brochure from Zeo–Tech GmbH (1 page).

Company Profile Zeo–Tech GmbH.

BALANCED ADSORBENT REFRIGERATOR

CROSS-REFERENCE TO PRIOR APPLICATION

This application claims priority from U.S. Provisional Patent Application No. 60/010,335, filed on Nov. 1, 1995.

TECHNICAL FIELD

The present invention is generally directed to a heat transfer apparatus that uses an adsorbent material to generate a cooling effect.

BACKGROUND OF THE INVENTION

Adsorption has previously been employed to generate a refrigeration effect. Adsorption is a process which utilizes the natural affinity certain adsorbent materials have for adsorbates. A typical refrigeration cycle employing adsorption includes two phases. During one phase, the dried or charged adsorbent material is exposed to a liquid adsorbate. The affinity the adsorbent has for the adsorbate causes the adsorbate to enter a vapor state as it is attracted to the adsorbent. The conversion of the adsorbate from a liquid state to a vapor state is an endothermic reaction which extracts heat from the environment surrounding the liquid, and therefore cools the environment and heats the adsorbent. During the second phase, additional heat is supplied to the adsorbent to expel or desorb the adsorbed vapor, thereby recharging the adsorbent. The desorbed vapor is condensed and cooled, and the two phase cycle is repeated.

Zeolite (also called a molecular sieve), is a general term for crystalline metal-alumosilicate adsorbents which are similar to sand in chemical composition. More than 40 natural and 100 synthetic zeolites are presently known. Zeolite has a large internal surface area of up to 100 $m^2/g$, and a crystal lattice with strong electrostatic fields. Zeolite retains adsorbates by strong physical forces rather than by chemisorption. This means that when the adsorbed molecule is desorbed by the application of heat or by displacement with another material, it leaves the crystal in the same chemical state as when it entered. The very strong adsorptive forces in zeolite are due primarily to the cations which are exposed in the crystal lattice. These cations act as sites of strong localized positive charge which electrostatically attract the negative end of polar molecules. The greater the dipole moment of the molecule, the more strongly it will be attracted and adsorbed. Polar molecules are generally those which contain O, S, Cl, or N atoms and are asymmetrical. Water is one such molecule. Under the influence of the localized, strong positive charge on the cations, molecules can have dipoles induced in them. The polarized molecules are then adsorbed strongly due to the electrostatic attraction of the cations. The more unsaturated the molecule, the more polarizable it is and the more strongly it is adsorbed.

Desorption from zeolite powders shows no hysteresis. The adsorption and desorption are completely reversible. With pelleted zeolite material, however, some further adsorption may occur at pressures near the saturation vapor pressure through condensation of liquid in the pellet voids external to the zeolite crystals. Hysteresis may occur on desorbing this macro-port adsorbate.

In a typical installation, an adsorbent vessel and a condensing vessel are interconnected. The adsorbent vessel contains an adsorbent such as zeolite and the condensing vessel contains a working fluid, such as the water brine mixture disclosed in U.S. Pat. No. 4,584,842. Assuming the adsorbent is in an uncharged state, the adsorbent vessel is heated to vaporize any working fluid contained therein and drive the fluid from the adsorbent vessel to the condensing vessel where it condenses. Both vessels are then cooled. As the adsorbent vessel cools, it begins to adsorb vapor from the working fluid in the condensing vessel. As the working fluid enters the vapor state, it adsorbs the heat of vaporization from its surroundings, which cools the condensing vessel and the working fluid remaining in the condensing vessel. When the adsorbent is saturated with working fluid vapor, the cycle is complete. The adsorbent vessel is then reheated, causing the vapor to return to the condenser and condense, repeating the previous cycle.

One drawback of the devices described above is that the working fluid, which is typically water, requires the addition of salt to form a brine mixture. Without the brine, the water will completely freeze and expand, breaking the condensing vessel and associated hardware. For example, the condensing vessel ideally includes thin, finned heat exchanger tubes to maximize the cooling rate in the condensing vessel. Such tubes are particularly prone to failure when subjected to freezing water. In addition, the brine remaining in the condensate vessel tends to harden when the working fluid is adsorbed, reducing the efficiency of heat transfer from the condensate vessel.

A further drawback of existing adsorbent refrigerators is that the capacity of the adsorbent is not matched to the volume of working substance. If the adsorbent capacity is too low, the adsorbent becomes saturated while there is still working substance in either a fluid or a solid state. This is inefficient because the adsorbent must be recharged more often than it would if it were sized to completely adsorb all the working fluid. If the adsorbent capacity is too high, the adsorbent vessel is larger than necessary and therefore inefficient to heat.

Accordingly, there is a need in the field for an adsorption apparatus which matches the quantity of the working substance to the capacity of the adsorbent and which can continue to adsorb the working substance whether the working substance is in a fluid state or a solid state without causing damage to the apparatus. The present invention fulfills these needs and provides further related advantages.

SUMMARY OF THE INVENTION

In brief, this invention is directed to a heat transfer apparatus that uses an adsorbent material to generate a cooling effect. The invention provides an improvement over the prior art because it is capable of adsorbing a working substance from the solid phase as well as the liquid phase, thereby eliminating the need for brine or other additives which reduce the freezing point of the working substance. The invention provides a further improvement over the prior art because the amount of adsorbent material is balanced to adsorb substantially all the working substance, thereby maximizing the cooling effect of the working substance contained within the heat transfer apparatus.

In one embodiment of the present invention, the apparatus includes a first vessel containing adsorbent material and a second vessel connected to the first with a conduit. The conduit provides a fluid passage between the vessels and the vessels together with the conduit form a sealed volume capable of maintaining a pressure below atmospheric pressure. The sealed volume contains a quantity of working substance which is selected to be substantially completely adsorbed by the adsorbent material. As the working substance is adsorbed, it cools the second vessel. Once the working substance has been completely adsorbed, the first vessel is heated to desorb the working substance back to the second vessel.

In a further aspect of the invention, a portion of the working substance located in the second vessel is in the solid state. The solid state working substance is completely adsorbed by sublimation into the adsorbent material contained in the first vessel.

In a further embodiment of the invention, the second vessel is housed within an insulated refrigeration chamber. During adsorption, the second vessel cools the refrigerated chamber in a manner suitable for storage of foodstuffs or other substances which require refrigeration.

In still a further embodiment of the present invention, a second vessel is adapted to be used with working substances which expand upon freezing. The second vessel contains a compressible material which compresses as the working substance changes from a liquid state to a solid state. The amount of compressible material contained within the second vessel and the amount of working substance contained therein are selected such that when the working substance freezes, the force exerted by the working substance and the compressed compressible material on the second vessel is less than the burst pressure limit of the second vessel.

In yet a further embodiment of the invention, the first vessel is used to heat the hot reservoir of a Stirling engine and the second vessel is used to cool the cold reservoir of the engine. The first and second vessels thereby increase the temperature differential of the reservoirs between which the Stirling engine operates and increase the efficiency of the engine.

In another embodiment of the invention, the conduit between the first and second vessels contains a turbine. The turbine is coupled to a power transmission device outside the conduit such that when vapor is passed from the second conduit to the first conduit by adsorption, the vapor rotates a rotor in the turbine, generating power which is transmitted to the power transmission device.

In a further embodiment of the present invention, the heat transfer apparatus includes a thermal voltaic device having a hot side and a cold side. The apparatus is positioned to increase the temperature of the hot side with the adsorbent vessel and decrease the temperature of the cold side with the condensing vessel, thereby increasing the voltage output of the thermal voltaic device.

The present invention also provides a method for transferring heat and a working substance between a first vessel containing an adsorbent material and a second vessel connected to the first vessel with a conduit. The method comprises allowing a liquid portion of the working substance to vaporize by adsorption and transfer from the second vessel to the first vessel, thereby causing a remaining portion of the liquid working substance in the second vessel to freeze, and continuing to adsorb the frozen portion of the working substance by sublimation until the working substance has been completely adsorbed.

These and other aspects of this invention will become evident upon reference to the following detailed description and attached drawings.

DETAILED DESCRIPTION OF THE INVENTION

As mentioned above, the present invention is directed to an apparatus for using a heat source to generate a refrigerating effect. The apparatus includes an adsorbent material which cyclically adsorbs and desorbs a working substance, causing a transfer of heat. The present invention increases the efficiency of the adsorption cycle by matching the capacity of the adsorbing material to the quantity of working substance. The invention further increases the efficiency of the adsorption cycle by retaining the working substance in a vessel which does not burst when the working substance solidifies, thereby permitting adsorption to continue after the working substance has solidified.

Figure 1:
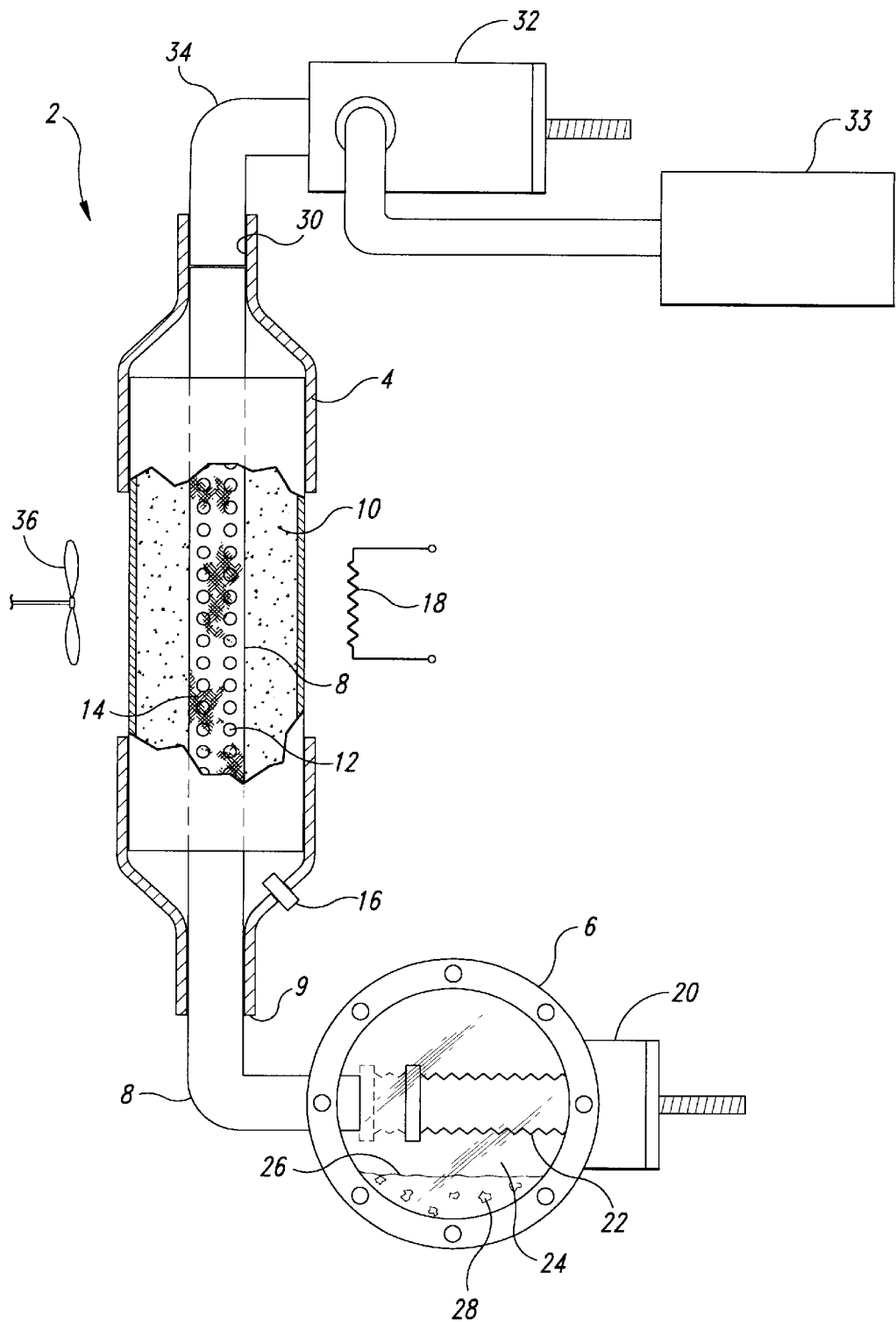
FIG. 1 is a partially cut away side view of an embodiment of the present invention with an adsorbent vessel coupled to a condensate vessel.

A representative apparatus in accordance with the present invention is shown in the figures for purposes of illustration. As shown in FIG. 1, an adsorbent vessel 4 of an apparatus 2 is connected to a condensate vessel 6 with a pipe 8 which passes through an aperture 9 located in the base of the adsorbent vessel. The adsorbent vessel 4 is packed with an adsorbent material 10 which has a strong affinity for polar working substances. The pipe 8 extends through the adsorbent vessel 4 and is surrounded by the adsorbent material 10. The pipe 8 contains perforations 12 which permit vapor to pass back and forth between the adsorbent material 10 and the pipe. A mesh cloth 14 covers the perforations 12 and prevents adsorbent material 10 from entering the pipe 8 through the perforations. The adsorbent vessel 4 contains a plug 16 for draining of the adsorbent vessel and for access to the vessel for purposes of maintenance.

A heat source 18 is located adjacent to the adsorbent vessel 4 and is positioned to heat the adsorbent vessel and its contents. The heat source 18 may be cycled between an active position in which it generates heat, heating the adsorbent vessel 4 and causing the adsorbent material 10 to release vapors (desorb), and an inactive position in which the adsorbent vessel 4 and its contents are permitted to cool. The heat source may take the form of an electric heater, combustion heater, the sun, or heating may be accomplished by passing magnets over copper tubing, for example, the vessel 4. Other heating methods known in the art may be used as well.

In one embodiment, the pipe 8 contains a vacuum valve 20 and a bellows 22. The vacuum valve 20 is movable between an open position, as shown in solid lines in FIG. 1 wherein the condensate vessel 6 may communicate with the adsorbent vessel 4 through the pipe 8, and a closed position indicated in phantom lines in FIG. 1 wherein the condensate vessel is sealed from communication with the adsorbent vessel. The condensate vessel 6 contains a viewing window 24 which permits viewing the condensed liquid working substance 26 and solid working substance 28 contained in the condensate vessel. In another embodiment, the vacuum valve 20 and bellows 22 are replaced with a commercial-grade vacuum valve, or other suitable valving device.

The adsorbent vessel 4 contains a second aperture 30 which is connected to a vacuum valve 32 by a pipe 34. The vacuum valve is connectable to a vacuum source 33 for purposes of evacuating the adsorbent vessel 4. It is desirable to reduce the pressure in the adsorbent vessel 4 in order to lower the temperature at which the liquid working substance 26 will vaporize and be adsorbed by the adsorbent material 10. However, depending upon the characteristics of the adsorbent material 10 and the working substance, pressures at and above atmospheric pressure are possible as well. The vacuum valve 32 is positionable between an open position which permits communication between the adsorbent vessel 4 and the vacuum source 33, and a closed position in which the adsorbent vessel 4 is sealed from the vacuum source.

Prior to operation of the apparatus 2, the vacuum valve 32 is opened, providing a fluid connection between the adsorbent vessel 4 and the vacuum source 33. The vacuum valve 20 is then opened, providing a fluid connection between the adsorbent vessel 4 and the condensate vessel 6. The pressure in the adsorbent vessel 4 and condensate vessel 6 is reduced. The vacuum valve 32 is then closed and the apparatus 2 is ready for operation. In one embodiment, the pressure within the vessel 4 is reduced to an absolute pressure of 4 mm of mercury (i.e., 4 mm of mercury above total vacuum), however other pressures are possible as well, depending on the type of adsorbent material 10 and working substance contained within the apparatus, as well as the temperature the apparatus is subject to.

In operation, the apparatus 2 cycles between an adsorption phase and a desorption phase. In the desorption phase, the heat source 18 is activated and heats the adsorbent vessel 4 and the adsorbent material 10, causing any liquid working substance contained in the adsorbent material 10 to vaporize. The working substance vapor passes from the adsorbent material 10, through the mesh cloth 14 and perforations 12, into the pipe 8 and then into the condensate vessel 6 where it condenses, forming a pool of liquid working substance 26. In one embodiment, wherein the working substance is water, the adsorbent vessel is heated to a temperature of 250° F. to desorb the working substance vapor. Other temperatures are possible as well, depending upon the characteristics of the adsorbent material 10, the working substance, and the amount of working substance which is desorbed during the desorption process. As shown in FIG. 1, the condensate vessel is preferably positioned beneath the adsorbent vessel 4, allowing gravity to aid the passage of condensate from the adsorbent vessel to the condensate vessel.

Once the working substance vapor has been desorbed from the adsorbent vessel 4 into the condensate vessel 6, the vacuum valve 20 is closed and both the condensate vessel 6 and the adsorbent vessel 4 are permitted to cool. In a one, both the adsorbent vessel and the condensate vessel cool to room temperature, approximately 70° F. The cooling rate of the adsorbent vessel 4 may be accelerated by adding a cooling source 36. However, the cooling source is not required for operation of the apparatus 2. Examples of cooling sources include fans, water jackets and other thermal dumps. Though the cooling source shown in FIG. 1 is external to the adsorbent vessel 4, it may also extend within the adsorbent vessel to more efficiently cool the adsorbent material 10 therein.

When the adsorbent vessel 4 and condensate vessel 6 have cooled, the adsorption refrigerator 2 is ready to begin the adsorption phase. The vacuum valve 20 is opened permitting fluid communication between the adsorbent vessel 4 and the condensate vessel 6, and providing an immediate, sudden cooling effect. The adsorbent material 10 adsorbs the liquid working substance 26, causing it to change phase from a liquid to a vapor and pass through the pipe 8, the perforations 12, the mesh cloth 14, and into the adsorbent material 10. As the liquid working substance passes from the liquid state to the vapor state, it extracts the heat of vaporization from the surrounding liquid working substance and from the condensate vessel 6 causing the water and condensate vessel to cool. As the condensate vessel 6 and its contents cool, the liquid working substance begins to form solid working substance 28. As the adsorption phase continues, the liquid working substance 26 disappears either because it is adsorbed by the adsorbent material 10 or because it turns entirely to solid 28.

Once the liquid working substance 26 has disappeared from the condensate vessel 6, adsorption continues as the solid working substance 28 sublimates directly to a vapor which is adsorbed by the adsorbent material 10. When the liquid 26 and solid 28 have been substantially completely adsorbed, the cycle is complete. The heat source is then reactivated, driving water vapor through the pipe 8 back into the condensate vessel 6 to repeat the refrigeration cycle. As used herein, the term substantially completely adsorbed means that substantially all the working substance, whether liquid phase or solid phase, has been adsorbed to a vapor phase, and transferred from the condensate vessel 6 to the adsorbent vessel 4.

The capacity of the adsorbent material 10 (i.e., the maximum amount of working substance it retains) relative to the amount of working substance in the apparatus 2 is an important feature of the invention. In one embodiment, the adsorbent material 10 is MOLSIV Type 13X zeolite manufactured by UOP Inc. of Des Plaines, Ill., and the working substance is water. In this embodiment, the capacity of the adsorbent material 10 is set at a value such that the adsorbent material completely adsorbs both the liquid water 26 and the ice 28. The volume of the adsorbent material 10 is selected based on the desired cooling load and rate to be 22 cubic inches (i.e., 0.51 pounds). The working substance is selected to be 60 cubic centimeters of water, (i.e., 28.5% of the weight of the adsorbent material 10), and the volume of the condensate vessel 6 is sized to be equal to the volume of the working substance. The amount of water desorbed by the adsorbent material 10 is 20 cubic centimeters when the adsorbent material is heated to 250° F. The remaining 40 cubic centimeters of water remains in the adsorbent material 10 after desorption. With this combination, residual water in the condensate vessel 6 is completely frozen approximately 11 seconds after vacuum valve 20 is opened and the adsorptive phase of the cycle begins. With no direct working load applied to the system (i.e., no source applying heat to the condensate vessel), the frozen residual is completely adsorbed by the adsorbent material 10 approximately 120–160 minutes later.

The adsorbent-to-working-substance ratios and temperatures selected above were selected to provide the cooling times indicated. Other ratios and temperatures are possible which adsorb and desorb more of the total working substance. Such ratios will reduce the frequency with which the adsorbent material 10 must be desorbed.

As discussed above, the adsorbent material 10 is zeolite and the working substance is water in one embodiment. Other working substances and other adsorbent materials, which have an affinity for the working substances are possible as well. Such working substances include $NH_3$, $H_2$, S, $N_2$, $CO_2$, etc., as well as both fluoro, chloro, and hydrocarbons, and mixtures of the same. These substances have varying affinities for adsorbent materials, as discussed below. Other adsorbent materials include molecular sieves, silicon gel, activated alumina and other similar sodalite type structures, including powders, pellets, particles, solid forms and gels of the same.

The external surface area of the adsorbent molecular sieve crystal is available for adsorption of molecules of all sizes, whereas, the internal area is available only to molecules small enough to enter the pores. The external area is only about 1% of the total surface area. Materials which are too large to be adsorbed internally will commonly be adsorbed externally to the extent of 0.2% to 1% by weight. Molecular sieves are available in a wide variety of types and forms. By choosing the appropriate adsorbent and operating conditions, it is possible to adapt molecular sieves to a number of specific applications. Not only will molecular sieves separate molecules based on size and configuration, but they will also adsorb preferentially based on polarity or degree of unsaturation. In a mixture of molecules small enough to enter the pores, the less volatile, the more polar or the more unsaturated a molecule, the more tightly it is held within the crystal.

For example, in one embodiment of the present invention, the working fluid is a mixture of $CO_2$ and water. The $CO_2$ more easily vaporizes than does the water. At the beginning of the adsorptive phase of the cycle, the $CO_2$ immediately vaporizes providing an immediate cooling effect. The water vaporizes more slowly but over a long period of time, providing for a long-term cooling. The $CO_2$, in addition to providing for an immediate cooling effect, improves the heat transfer rate from the heat source 18 to the adsorbent material 10, thereby reducing the time and energy required to desorb the adsorbent material. Substances such as nitrogen may be used in combination with water as well. The nitrogen provides thermal conductivity, increasing the efficiency with which heat may be transferred away from the adsorbent material during desorption. Because the adsorbent material 10 does not adsorb nitrogen as strongly as water, the nitrogen does not prevent the adsorbent material 10 from adsorbing water.

In one alternate embodiment of the device illustrated in FIG. 1, the vacuum valve 20 is eliminated. As a result, the adsorbent material continuously adsorbs the working substance and continuously rather than suddenly cools the condensate vessel and its contents.

In the embodiment illustrated in FIG. 1, the diameter of the adsorbent vessel 4 is 2.4 times the diameter of the pipe 8; however, other pipe diameters and configurations are possible as well. For example, the portion of the pipe 8 which is positioned within the adsorbent vessel 4 may be divided into a plurality of smaller pipes, each with perforations 12 and mesh cloth 14. The increased number of pipes increases the rate of vapor transfer between the adsorbent 10 and the condensate vessel 6.

As illustrated in FIG. 1, the heat source 18 is located external to the adsorbent vessel 4, however other arrangements are possible. For example, the heat source 18 may be placed within the adsorbent vessel 18 so as to more efficiently heat the adsorbent material 10. In one such embodiment, the heat source 18 includes a water resistant incalloy element, and the adsorbent material 10 is adhered directly to the element to provide an intimate bond for efficient heat transfer. In this embodiment, the incalloy, or other suitable material, is capable of being exposed to air without melting while under a heat load. The binder material may be polyphenylene sulfide (PPS) or aluminum phosphate. Aluminum phosphate is advantageous as a binder because it adds structural strength by combining activated alumina and/or aluminum oxide with the zeolite and can be heated above 600° F. PPS does not add as much strength but does not require the addition of activated alumina or aluminum oxide, so that 100% of the adsorbent can be zeolite.

Figure 12:
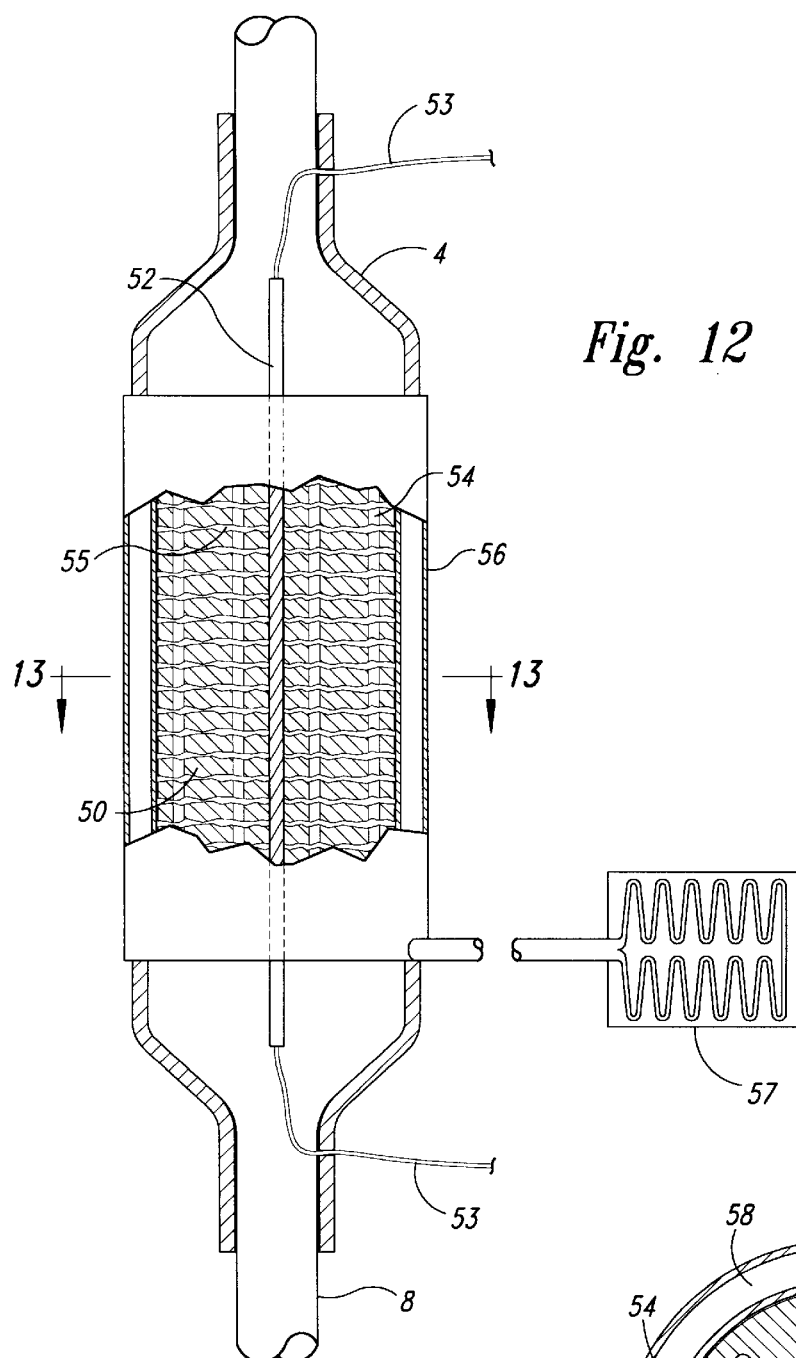
FIG. 12 is an embodiment of the invention which includes an internal heat source, retaining machined adsorbent material, and an external annular heating or cooling device.
Figure 13:
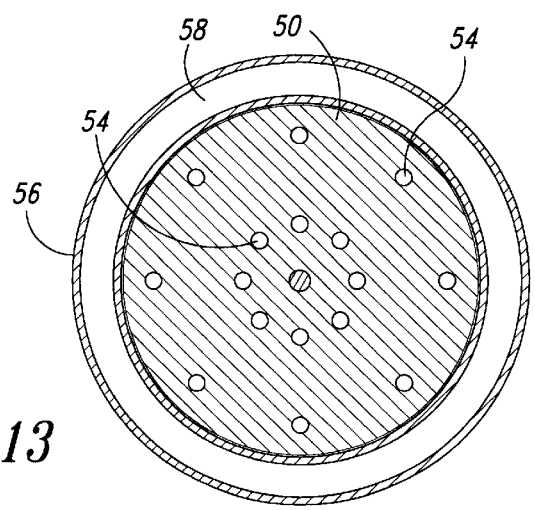
FIG. 13 is a cross-sectional view of the embodiment of FIG. 12 taken substantially along line 13—13.

In one embodiment illustrated in FIGS. 12 and 13, the adsorbent material is in the form of machined adsorbent disks 50 which are stacked on a solid heating element 52 formed from a material such as incalloy, which can be electrically heated by applying a voltage to cables 53. Each adsorbent disk 52 has holes 54 which permit desorbed vapor to be passed between the adsorbent disks 50 and the pipe 8. The adsorbent disks 50 may be machined to provide rough surfaces 55 which allow air to pass between the adsorbent disks to cool or heat the adsorbent disks as desired. A heat transfer jacket 56 annularly surrounds the external surfaces of the adsorbent disks 50. The heat transfer jacket is connected to a heat exchange source 57 to vary the temperature of the adsorption vessel 4. A fluid 58 such as water passes between the heat transfer jacket 56 and the heat exchange source 57 to transfer heat between the adsorbent disks 50 and the heat exchange source 57. The adsorbent disks 50 may be machined to any desired shape and may be stacked on heating elements 52 having varying lengths so as to fit within adsorbent vessels 4 having varying dimensions.

As shown in FIG. 12, the heat exchange source 57 and heat transfer jacket 56 may act to transfer heat to or from the adsorbent disks 50. When the heat exchange source 57 and heat transfer jacket act 56 to heat the adsorbent disks 50, they increase the rate at which the adsorbent disks desorb the working substance, reducing the time required to desorb the adsorbent vessel 4, thereby reducing overall cycle time. When the heat transfer jacket 56 and heat exchange source 57 act to cool the adsorbent disks 50, they immediately quench the adsorbent disks, reducing the time required to cool the adsorbent disks prior to the next adsorption phase, again reducing overall cycle time.

Figure 14:
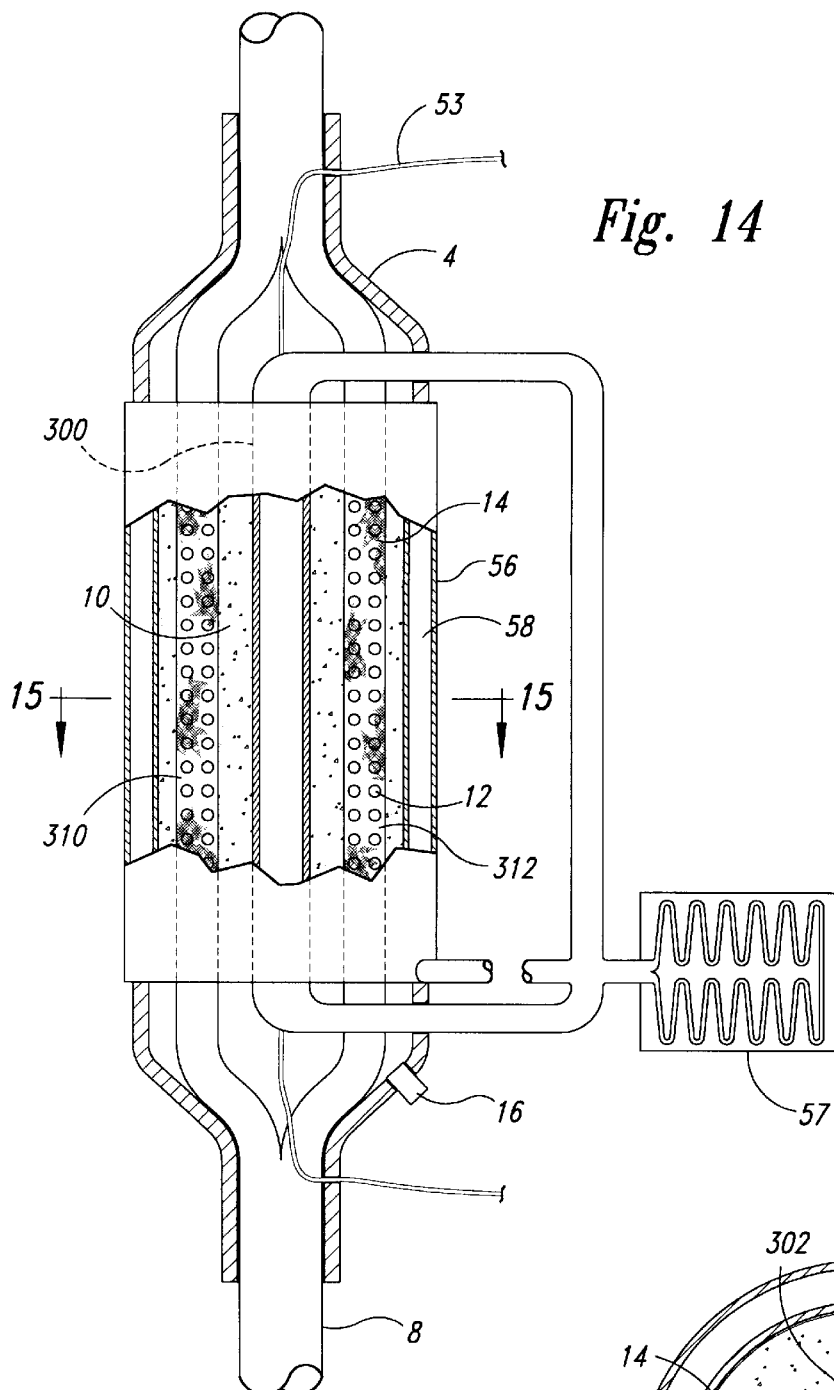
FIG. 14 is an embodiment of the invention which includes a hollow internal heat transfer source and an external annular heat transfer source, both heat transfer sources being suitable for heating or cooling the adsorbent material.
Figure 15:
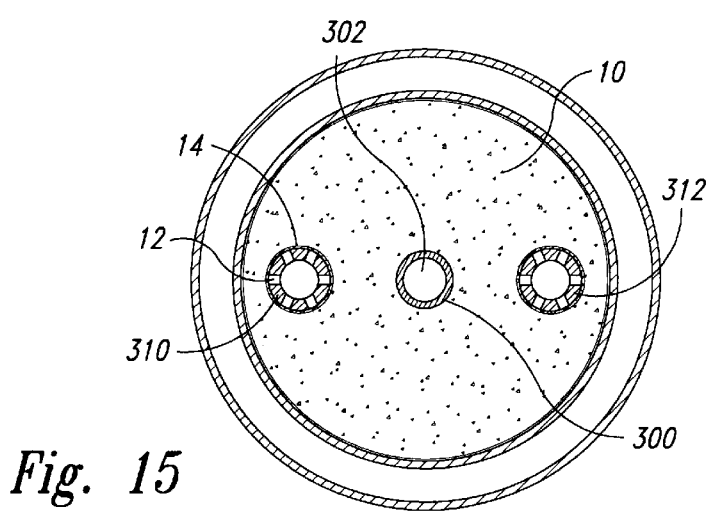
FIG. 15 is a cross-sectional view of the embodiment of FIG. 14 taken substantially along line 15—15.

In another embodiment illustrated in FIGS. 14 and 15, the adsorbent material 10 is in the form of powder or pellets. A heating element 300 formed from a material such as incalloy passes through the adsorbent material 10 and is connected to the heat exchange source 57. The heating element 300 has an annular cavity 302 through which fluid 58 passes. The heat transfer jacket 56 is also coupled to the heat exchange source 57, and also contains fluid 58.

As shown in FIGS. 14 and 15, the pipe 8 is bifurcated into perforated sections 310 and 312. The perforated sections 310 and 312 contain perforations 12 to permit vapor to pass between the adsorbent material 10 and the perforated sections, and mesh cloth 14 to prevent the adsorbent material from entering the perforated sections. Although two perforated sections 310 and 312 are shown in FIGS. 14 and 15, a greater number of perforated sections is possible as well to maximize the rate of vapor transfer between the adsorbent material 10 and the perforated sections. As discussed above in relation to the embodiment illustrated in FIGS. 12 and 13, the heat exchanger source 57, heat transfer jacket 56 and annular heating element 300 may act to heat or cool the adsorbent material 10. When hot fluid, such as water or other suitable fluid, is passed from the heat exchange source 57 through the heat transfer jacket 56 and through the annular cavity 302 and the heating element is heated with an electric current supplied through cables 53, the rate at which the adsorbent material 10 desorbs is increased, reducing the time required to prepare the adsorbent vessel 4 for adsorption. When cold fluid, such as water or other suitable fluid, is passed from the heat exchange source 57 through the heat transfer jacket 56 and through the annular cavity 302, the adsorbent material 10 is immediately quenched, further reducing the time required to prepare the adsorbent vessel 4 for adsorption after it has been heated and prior to desorption.

Figure 2:
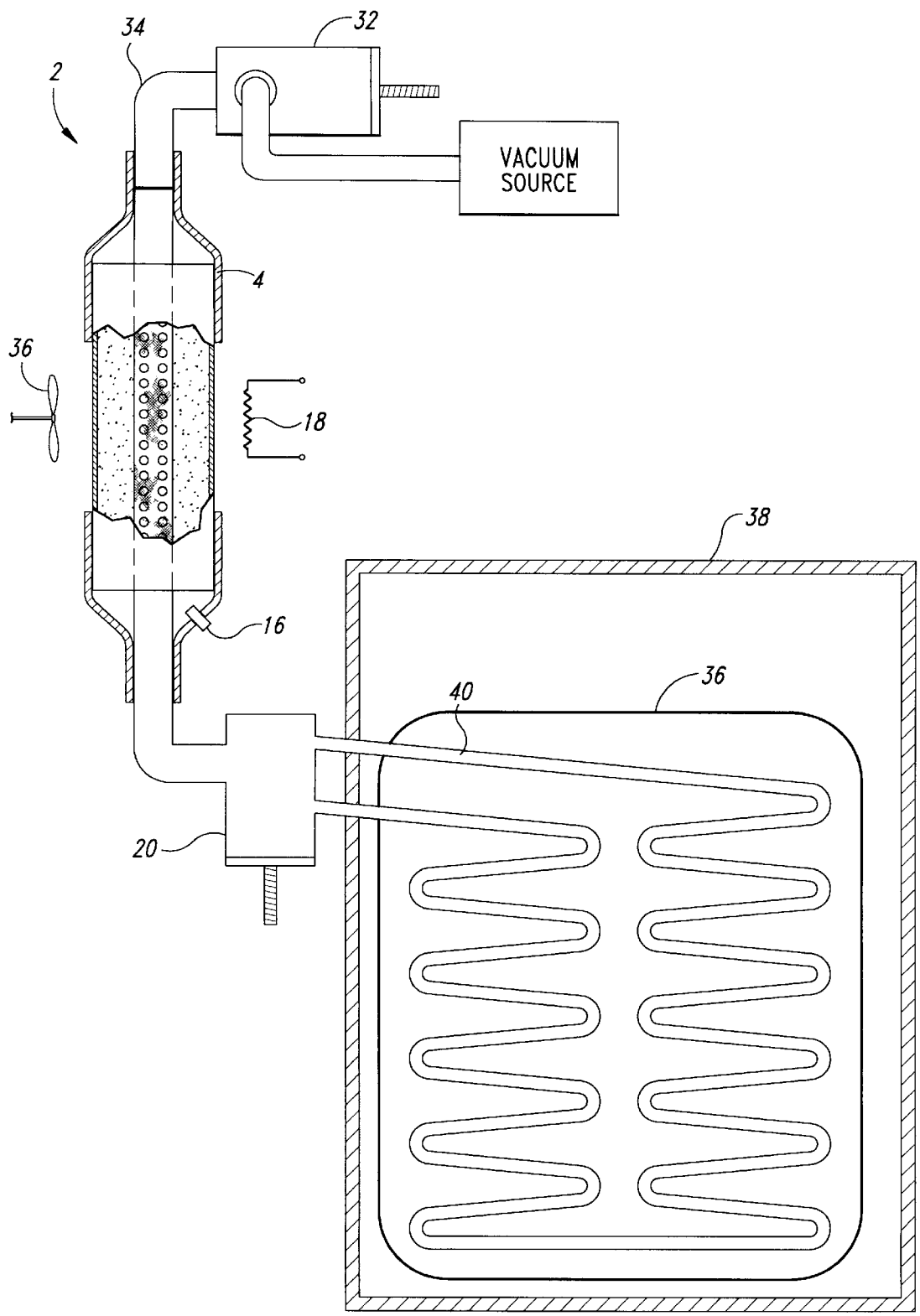
FIG. 2 is a cross-sectional view of an embodiment of the invention in which the condensate vessel includes heat exchanger tubing and is housed in a refrigerated box.

In another embodiment illustrated in FIG. 2, the condensate vessel is replaced by a heat exchanger 36 which is positioned within an insulated box 38. The operation of the adsorbent vessel 4 is substantially the same as operation of the adsorbent vessel discussed above in relation to FIG. 1. As the heat exchanger cools during the adsorption phase, it cools the box 38. The box 38 may then be used to store any items, such as foodstuffs, which require refrigeration. The heat exchanger 36 contains heat exchanger tubing 40 which serves the same purpose as did the condensate vessel 6 of FIG. 1. However, the heat exchanger tubing 40 provides a greater heat transfer surface area than does the condensate vessel 6 and therefore more efficiently cools the box 38. The heat exchanger tubing 40 is oriented at a downward angle to take advantage of gravitational forces as the heat exchanger tubing is filled with condensate.

Figure 3:
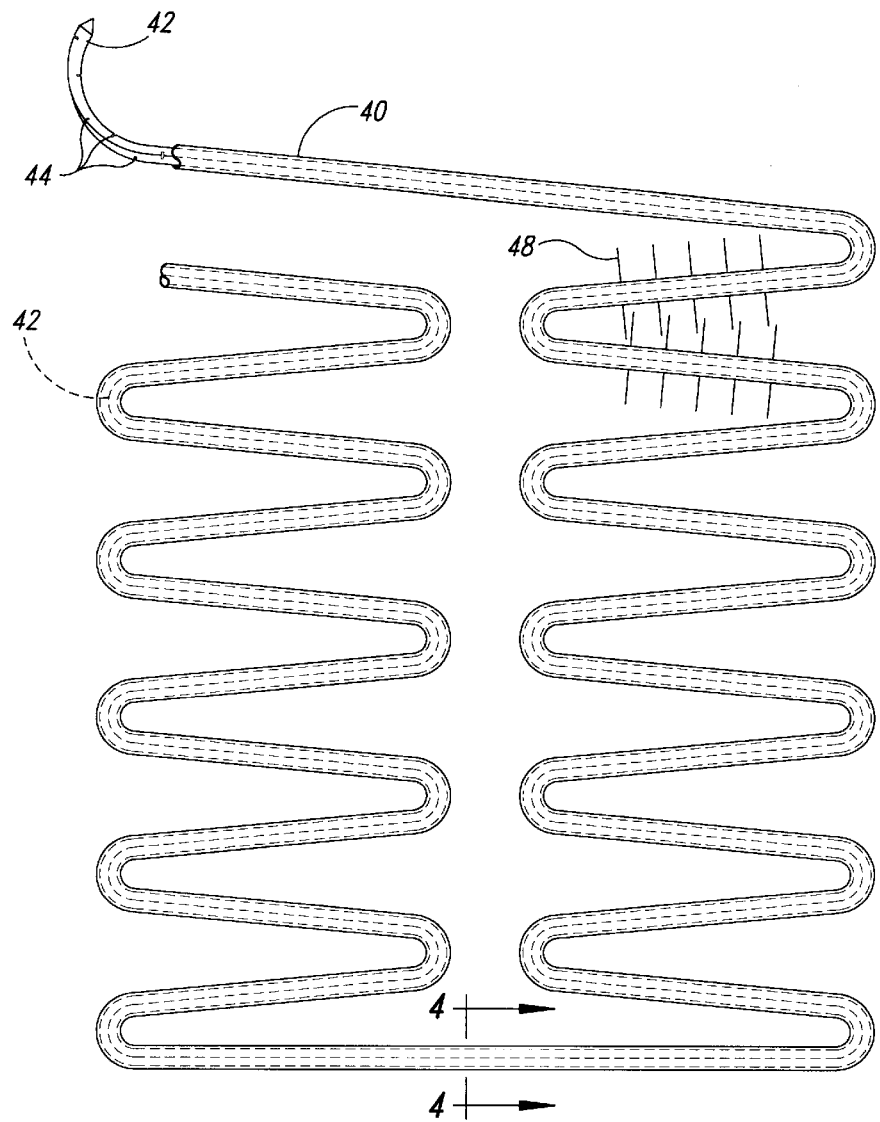
FIG. 3 is a side view detail of the heat exchanger tubing of FIG. 2 including a compressible material insert and fins.

The heat exchanger tubing 40 is shown in greater detail in FIG. 3. In this embodiment, the working substance is a material which expands when solidified, such as water. As seen in FIG. 3, the heat exchanger tubing 40 contains a foam or other compressible material 42 which accommodates the expansion of the working substance 26 as it freezes. The freezing water exerts pressure on the walls of the heat exchanger tubing 40, creating a hoop stress, and on the compressible material 42. Because the compressible material 42 is more compressible than the walls of the heat exchanger tubing, it deforms thereby preventing the pressure from exceeding the hoop strength of the heat exchanger tubing 40 as the working substance freezes completely. Once the working substance has completely frozen, it continues to sublimate and be adsorbed by the adsorbent material 10 as discussed previously. As used herein, the hoop strength refers to the stress beyond which the walls of the heat exchanger tubing 40 or other vessel in which the compressible material 42 is placed burst.

It is desirable to size and position the compressible material 42 in the heat exchanger tubing 40 to leave a flow area in the heat exchanger tubing adequate to permit the flow of working substance vapor through the heat exchanger tubing during adsorption. At the same time, it is desirable to provide sufficient compressible material 42 so that the freezing working substance does not completely compress the compressible material 42 and then burst the heat exchanger tubing 40. Therefore, in a one, the ratio of the working substance volume to compressible material 42 volume is selected such that when the working substance freezes and expands, compressing the compressible material 42, the combined pressure exerted by the frozen working substance, any remaining liquid working substance, and the compressible material 42 is less than the hoop strength of the heat exchanger tubing 40.

In the embodiment illustrated in FIG. 3, the heat exchanger tubing comprises a single section having openings 46 which communicate with the adsorbent vessel 4. Other embodiments are possible as well. For example, the heat exchanger tubing 40 may be divided into several lengths, each having openings 46 which communicate with the adsorbent vessel. Such an arrangement increases the exposure of the fluid within the heat exchanger tubing to the adsorbent vessel 4. In a further embodiment, the heat exchanger tubing 40 may be fitted with fins 48 which increase the rate of heat transferred from the box 38 to the heat exchanger tubing, thereby increasing the rate at which the box is cooled.

Figure 4:
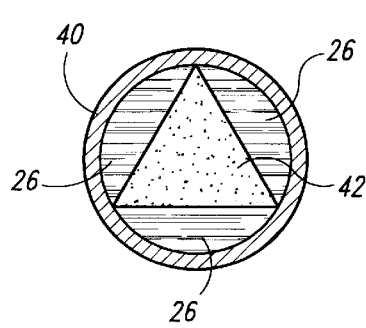
FIG. 4 is a cross-sectional view taken substantially along line 4—4 of FIG. 3.
Figure 5:
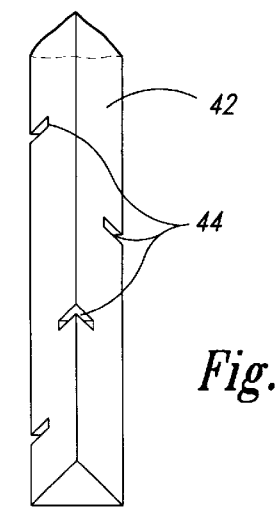
FIG. 5 is a detail of the compressible material insert of FIG. 3.

In one embodiment of the invention, the compressible material 42 has a triangular cross-sectional shape as is shown in FIG. 4. This shape permits the working substance 26 to pass through the tube around the compressible material 42. This shape also forces the working substance 40 contained within the heat exchanger tubing 40 to the walls of the tubing for maximum heat transfer efficiency. Other shapes which serve to position the working substance at the walls for maximum heat transfer are possible as well. As is shown in FIG. 5, notches 44 allow the working substance 26 to pass from one side of the compressible material 42 to the other, thereby enhancing the rate at which liquid and vapor pass through the tube 40. In this embodiment, the notches 44 are arranged in a helical pattern as shown in FIG. 5 to permit the liquid and vapor to more easily pass from one side of the compressible material 42 to another without compromising the structure of the compressible material 42. The helical arrangement of the notches also serves to minimize the hoop stress on the heat exchanger tubing 40 created when the compressible material 42 is compressed.

Although the compressible material 42 is shown in FIG. 3 positioned in the heat exchanger tubing 40, the compressible material 42 may be placed in any vessel which is subject to bursting when liquid contained therein freezes and expands. For example, the compressible material 42 may be placed in an outdoor water faucet to prevent the faucet from breaking when the ambient temperature falls below freezing. In these embodiments, the compressible material 42 may have any shape conforming to the shape of the vessel in which it is positioned, and need not be triangular or elongate, as shown in FIGS. 3 and 4. The compressible material may be positioned within the vessel such that it is adjacent to a first wall of the vessel and spaced apart from a second wall of the vessel. In this way, the compressible material acts to insulate the first wall of the vessel, and to position the working substance adjacent to the second wall of the vessel for maximum transfer of heat between the working substance and the second surface.

Compressible material pellets may be used in vessels where the vessel shape does not easily accommodate a single piece of compressible material. Although the heat exchanger tubing 40 is typically made from a thin walled, rigid, thermally conductive material, the compressible material 42 may also be installed in a vessel having flexible walls. In this embodiment, both the vessel walls and the compressible material 42 flex when the liquid contained therein freezes. Other such applications of the compressible material 42 will be known to those skilled in the art.

Figure 6:
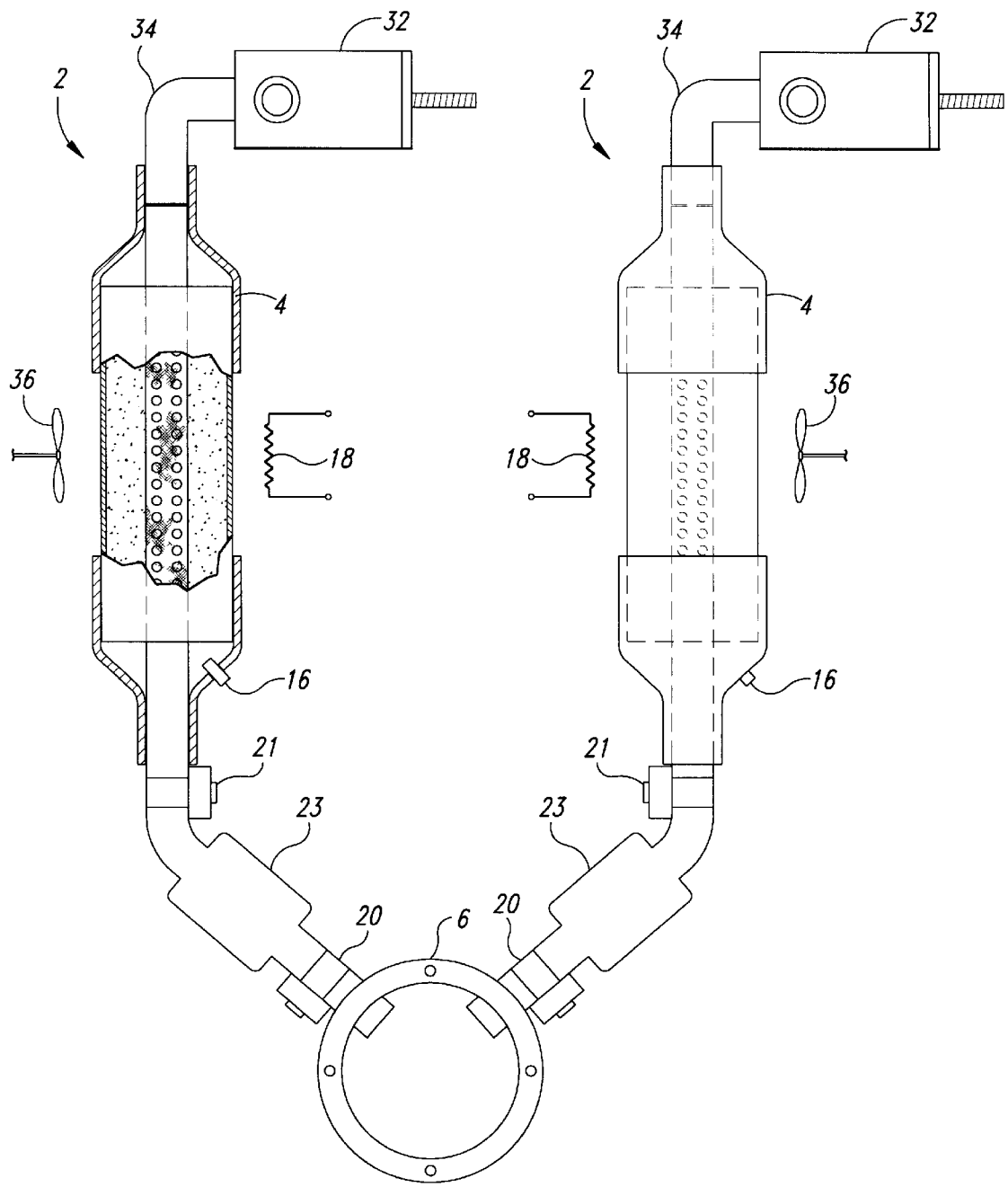
FIG. 6 is an embodiment of the present invention in which two adsorbent vessels are connected to a single condensate vessel.

In another embodiment of the present invention, illustrated in FIG. 6, two adsorbent vessels 4 are connected to the condensate vessel 6. Each adsorbent vessel 4 is operated in substantially the same manner as discussed previously, but the two adsorbent vessels are operated out-of-phase so that when one adsorbent vessel is adsorbing working substance from the condensate vessel, the other adsorbent vessel is being heated by a heat source 18 and desorbing vapor and condensate into the condensate vessel 6. While the heated vessel is desorbing vapor, the vacuum valve 20 directly connected to the vessel is closed to prevent the condensate from being immediately adsorbed by the adjacent adsorbing vessel. Valve 21 is opened to permit the condensate to condense in an accumulator 23 without disturbing the simultaneous adsorption conducted by the other adsorbent vessel 4. When desorption from the desorbing vessel is complete, the valve 20 associated with the desorbing vessel is opened, allowing the working substance to flow from the accumulator 23 into the condensate vessel 6. In a one, the heat sources 18 and adsorbent vessels 4 are sized so that when one adsorbent vessel is completely desorbed, cooled, and ready to adsorb, the other adsorbent vessel is saturated and ready to desorb. The roles of the vessels are then reversed; the formerly desorbing vessel adsorbs from the condensate vessel 6 and the formerly adsorbing vessel desorbs into the accumulator 23. Although two adsorbent vessels are shown in FIG. 6, other configurations utilizing more adsorbent vessels are possible as well. Such embodiments are advantageous because they eliminate the need to exactly match the desorption time for one vessel to the adsorption time of the other.

Figure 7:
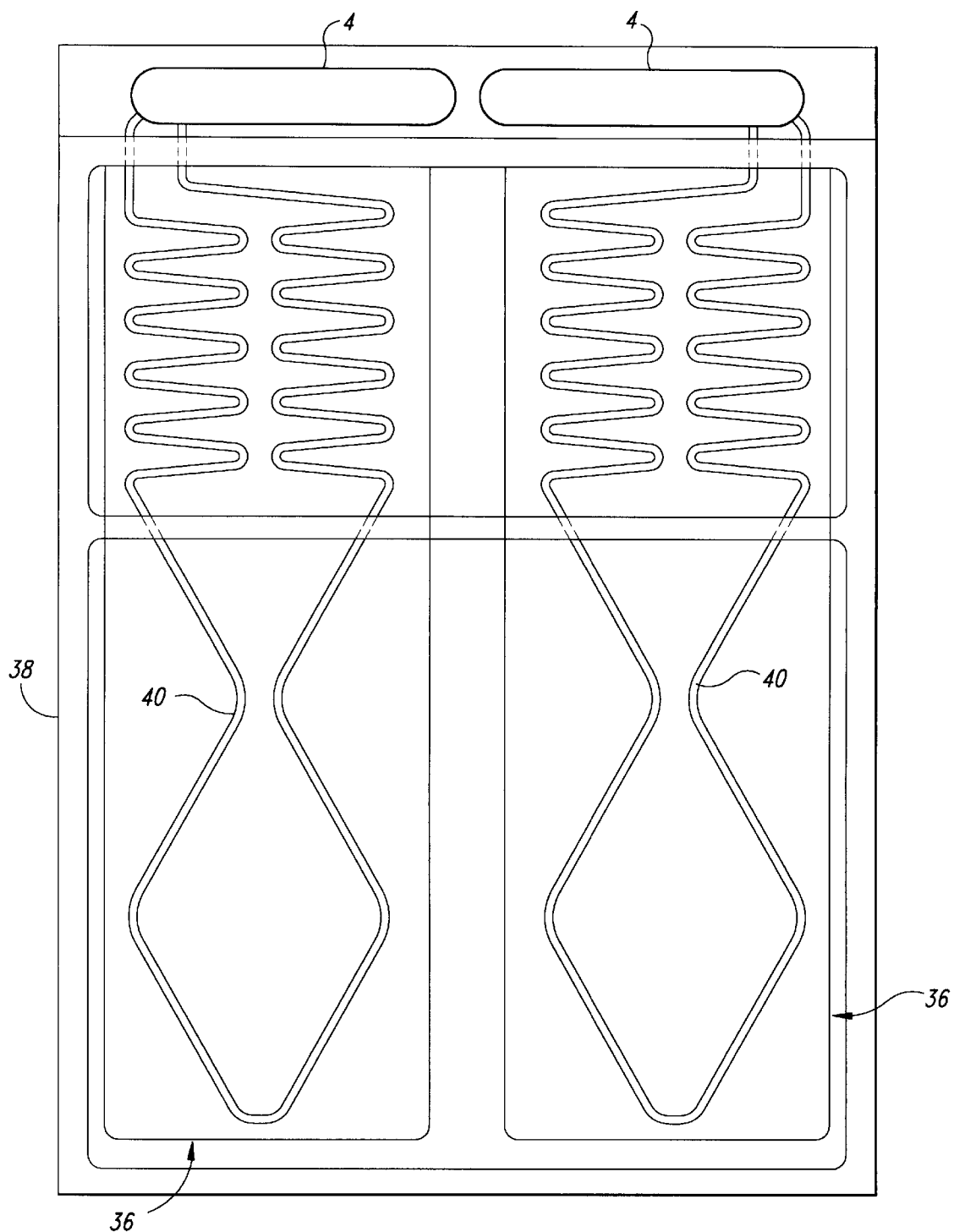
FIG. 7 is an embodiment of the present invention in which two adsorbent vessels are each connected to separate heat exchangers to provide for continuous cooling of the refrigerated box.

FIG. 7 illustrates a continuous cycle using multiple adsorbent systems together. Each adsorbent vessel 4 is coupled to a separate heat exchanger 36 containing heat exchanger tubing 40. As with the embodiment illustrated in FIG. 6, the adsorbent vessels 4 are operated out-of-phase, so that when one adsorbing vessel 4 is adsorbing the working substance from the heat exchanger 36 to which it is connected, the other adsorbing vessel is desorbing the working substance to its heat exchanger. In this manner, the insulated box 38 may be maintained at a substantially constant temperature.

The box 38 has an upper freezer portion and a lower refrigerator portion. The upper freezer portion contains a relatively high density of heat exchanger tubing per unit volume of the box to achieve the low temperatures typically required for freezing foodstuffs. The lower refrigerator portion contains a lower density of heat exchanger tubing per unit volume of the box than does the freezer portion, and is suitable for maintaining foodstuffs at typical refrigerator temperatures above 32° F. Other embodiments employing more than two adsorbing vessels and heat exchangers are possible as well. Such embodiments are advantageous because they eliminate the need to exactly match the desorption time for one vessel to the adsorption time of the other.

Figure 8:
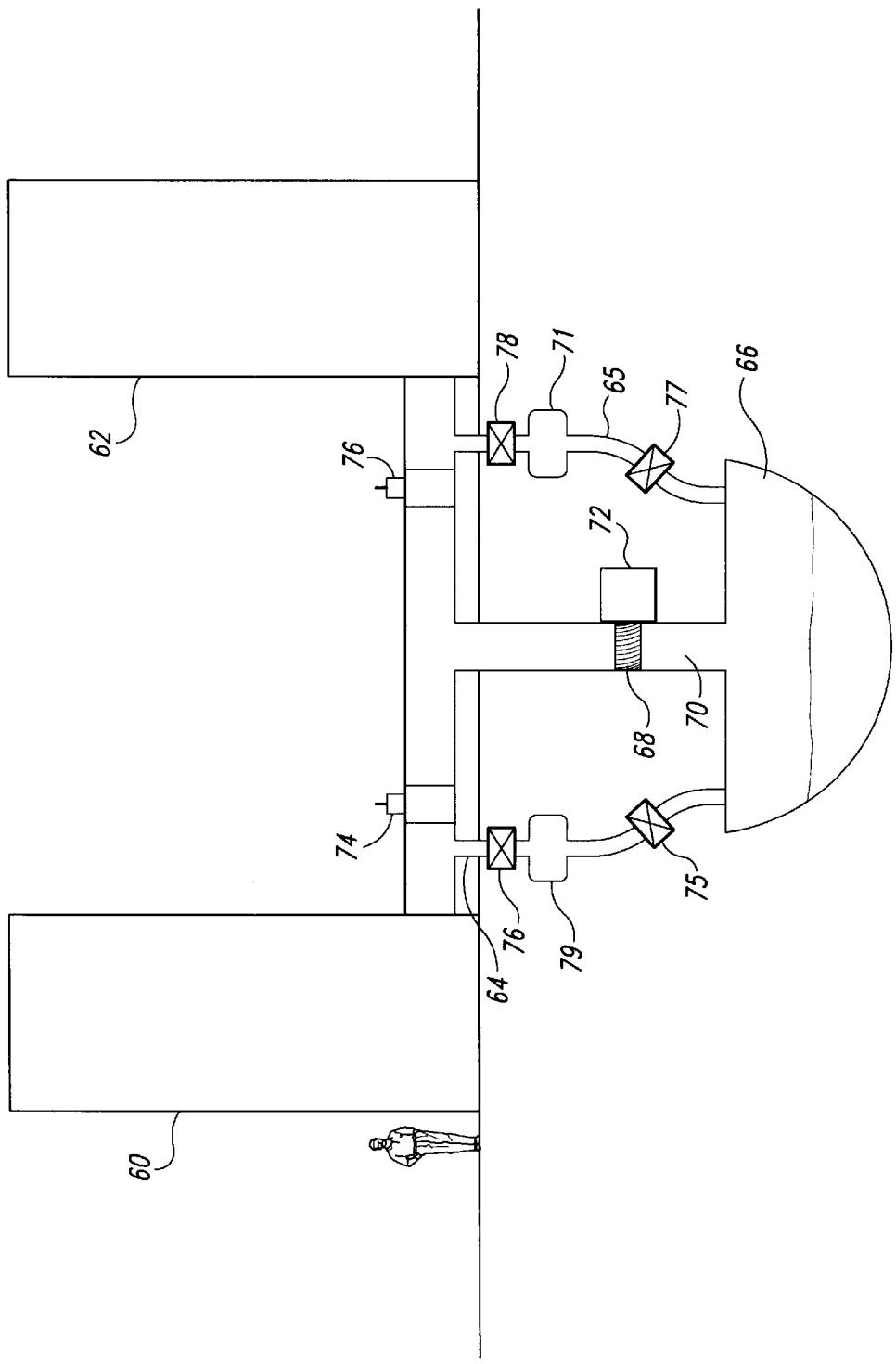
FIG. 8 is a schematic view of an alternate embodiment of the present invention in which two adsorbent vessels are used in conjunction with the condensate vessel to drive a turbine.

FIG. 8 illustrates an embodiment of the present invention in which two adsorbent vessels 60 and 62 are connected to condensing vessel 66. The flow of adsorbing vapor between the adsorbent vessels 60 and 62 and the condensing vessel 66 drives a turbine 68 located at the entrance 70 of the condensing vessel to provide power to the power transfer equipment 72. Valves 74 and 76 may be opened or closed as desired to permit communication of one or the other of the adsorbent vessels 60 and 62 with the condensing vessel 66. Bypass valves 75, 76, 77 and 78 allow condensate to return to the condensing vessel 66 through accumulators 79 and 71.

In operation, adsorbent vessel 60 is in a fully saturated state and adsorbent vessel 62 is in a fully desorbed and charged state, valve 76 is opened, valve 74 is closed, valve 75 is closed and valves 77 and 78 are closed. In a typical installation, the flow rate of working substance during desorption is too low to generate power at the turbine 68. Therefore, when the first adsorbent vessel 60 is heated, vapor leaving the vessel is routed through the bypass pipe 64 around the turbine 68 and into the accumulator 79. The second adsorbent vessel 62 adsorbs vapor from the condensate vessel 66, causing the vapor to pass through the turbine 68. As the vapor passes through the turbine 68, it rotates the turbine. The rotational motion of the turbine is transferred by power transfer equipment 72 using means known in the art, such as a tightly sealed shaft or an eddy current coupling. Once the second adsorbent vessel 62 is saturated with vapor and the first adsorbent vessel 60 is fully charged, the roles of the vessels are reversed. Valves 75, 76 and 77 are closed, and valves 74 and 78 are opened. The first adsorbent vessel 60 adsorbs vapor from the condensate vessel 66, driving the turbine 68, while the second adsorbing vessel 62 desorbs vapor through the bypass pipe 65 into the accumulator 71.

Figure 9:
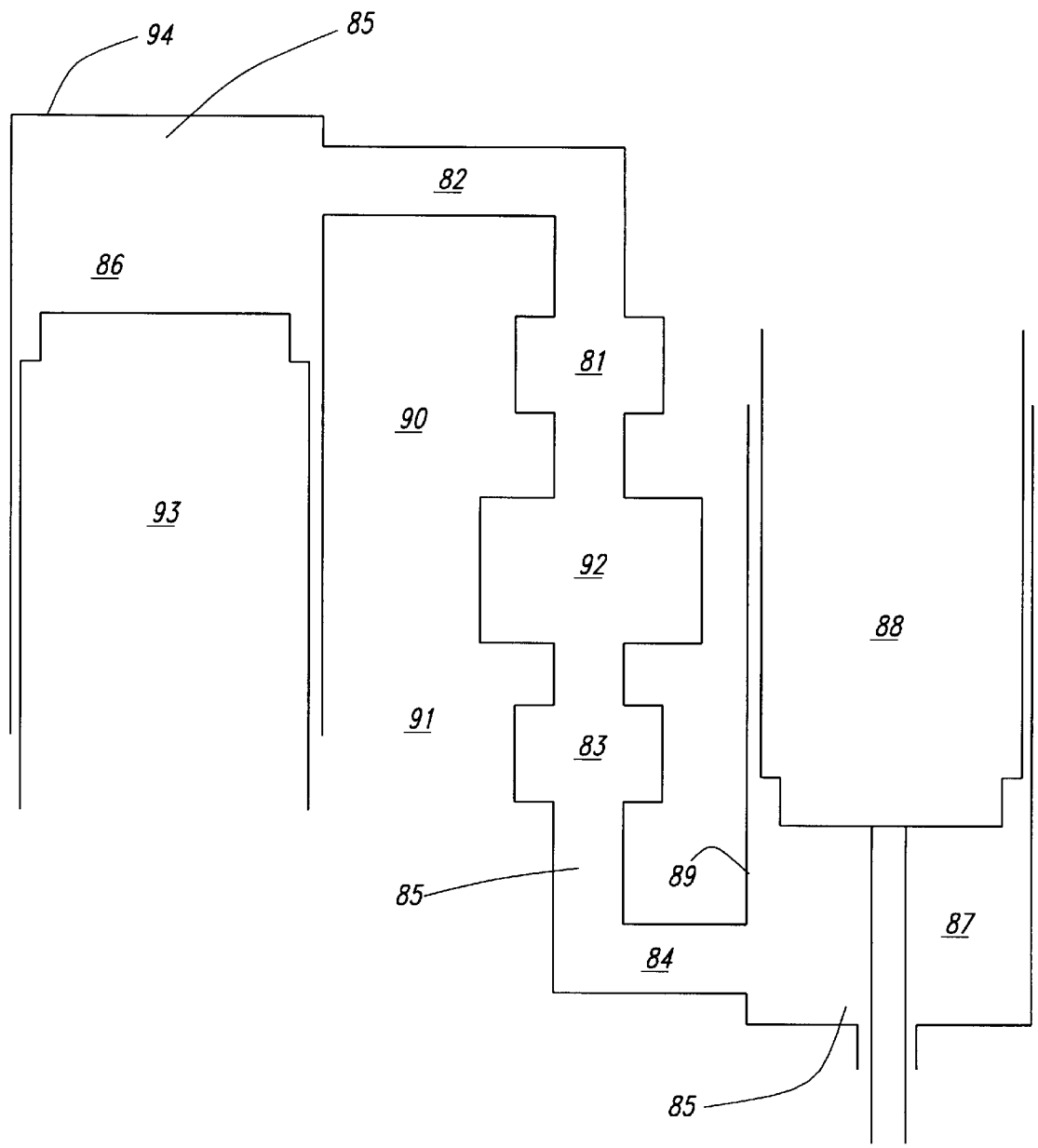
FIG. 9 is a schematic of an alternate embodiment of the present invention in which the adsorbent vessel and condensate vessel are integrated into a basic Stirling engine cycle.

Other applications of the adsorbent refrigerator device disclosed in the present invention are possible as well. For example, the apparatus can be used to lower the cold side temperature of a Stirling engine, thereby increasing the efficiency of the engine. FIG. 9 illustrates a basic regenerative Stirling engine cycle, as disclosed in U.S. Pat. No. 5,456,076 which is incorporated in its entirety herein by reference. The basic Stirling engine cycle at a minimum comprises: a heat source 81 supplying heat energy to a hot region 82, a heat sink 84 removing heat from a cold region 83, a thermally conductive gaseous working fluid 85 which transports heat energy between the hot cylinder region 86 and cold cylinder region 87, a displacer piston 88 reciprocating in a displacer cylinder 89 having a hot chamber 90 and a cold chamber 91, the hot and cold chambers being connected by a thermally insulated regenerative heat exchanger 92, a power piston 93 reciprocating in a power cylinder 94, a means for converting motion of the power piston into useful power such as a rotating crankshaft, and a means for controlling the timing of the movement of the displacer relative to the power piston. The power piston 93 and displacer piston 88 may be free floating, as in a free floating Stirling linear generator, or mechanically connected. In this embodiment, the heat source 81 includes an adsorption vessel, and the heat sink 84 includes a condensate vessel of the type previously discussed. The adsorption vessel and condensate vessel heat and cool the heat source 82 and heat sink 83, respectively, increasing the engine efficiency. In addition, the regenerative heat exchanger 82 may be replaced with an adsorbent vessel/condensate vessel combination of the type previously discussed. The heat source 81 may include solar energy, so that during the day, the heat source heats adsorbent material, charging the adsorbent vessel. At night the adsorbent vessel adsorbs the working substance from the condensate vessel, heating the adsorbent vessel and cooling the condensate vessel. In this manner the inclusion of the adsorbent vessel and condensate vessel serves to store solar energy and keep the Stirling engine operating, even at night.

In another alternate embodiment of the invention the adsorptive refrigerator may be used to improve the efficiency of thermal voltaic cells. The adsorptive refrigerator is used to reduce the cold side temperature of the voltaic cells and therefore increase the voltage output. Further embodiments are possible as well. For example, the heat transfer apparatus may be used to cool a flat plate used for fish processing, or to cool computer chips, power substations or cars. In each embodiment, relatively low grade heat which is readily available is used to generate the desired cooling effect.

Figure 10:
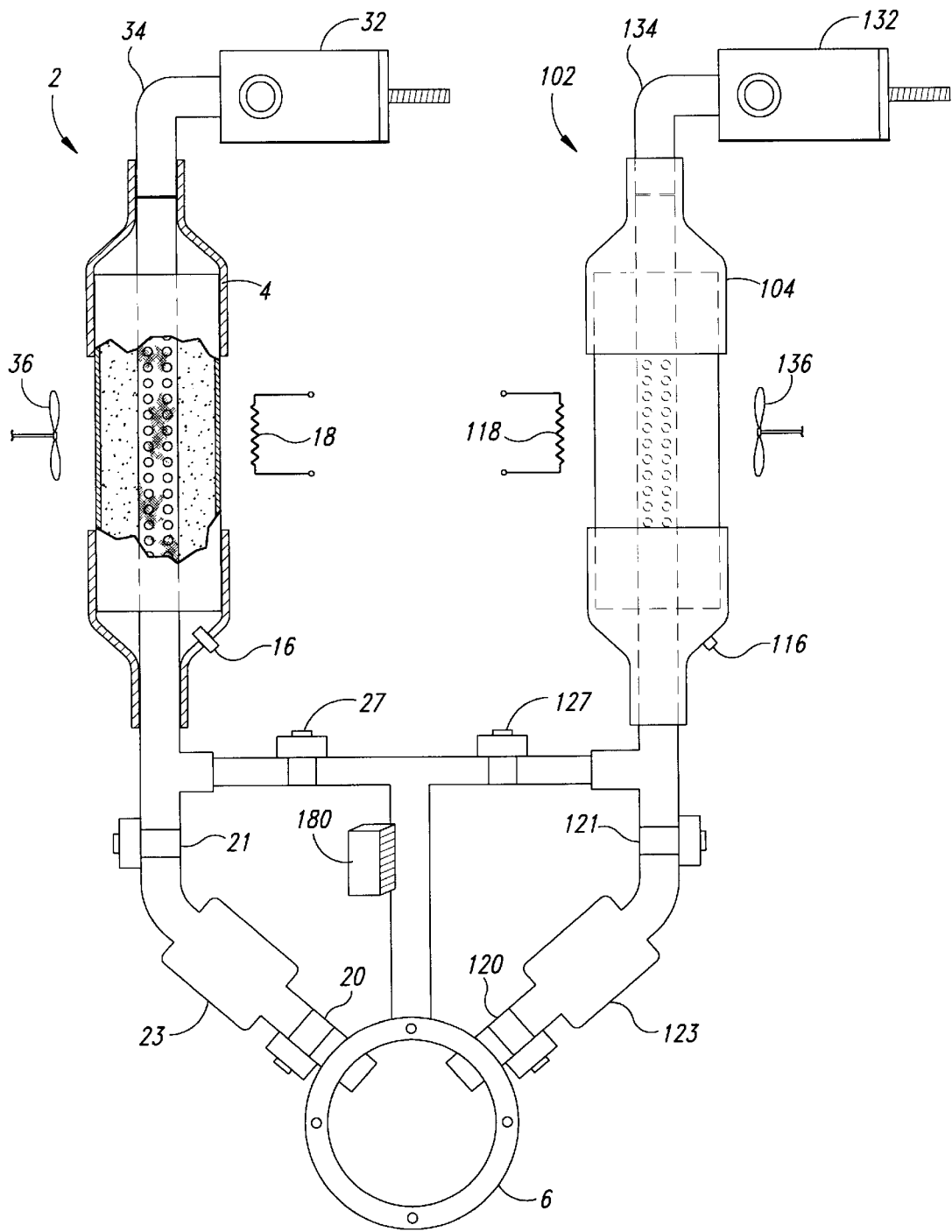
FIG. 10 is an embodiment of the present invention in which two adsorbent vessels are connected to a single condensate vessel and includes accumulators for pre-condensing a working substance.

FIG. 10 illustrates an embodiment of the invention in which first and second adsorbent vessels 4 and 104 operate with a single condensate vessel 6 to cool a computer chip 180. While the first adsorbent vessel 4 is desorbing to an accumulator 23 with valve 21 open and bypass valve 27 and vacuum valve 20 is closed, the second adsorbent vessel 104 is adsorbing from the condensate vessel 6 with vacuum valve 120 and valve 121 closed and bypass valve 127 open. When the second adsorbent vessel 104 has completed adsorption and the first adsorbent vessel 4 has completed desorption, the positions of the valves are reversed and adsorbent vessel 4 begins to adsorb as adsorbent vessel 104 desorbs into the accumulator 123. In this way, the computer chip 180 is continuously cooled.

Figure 11:
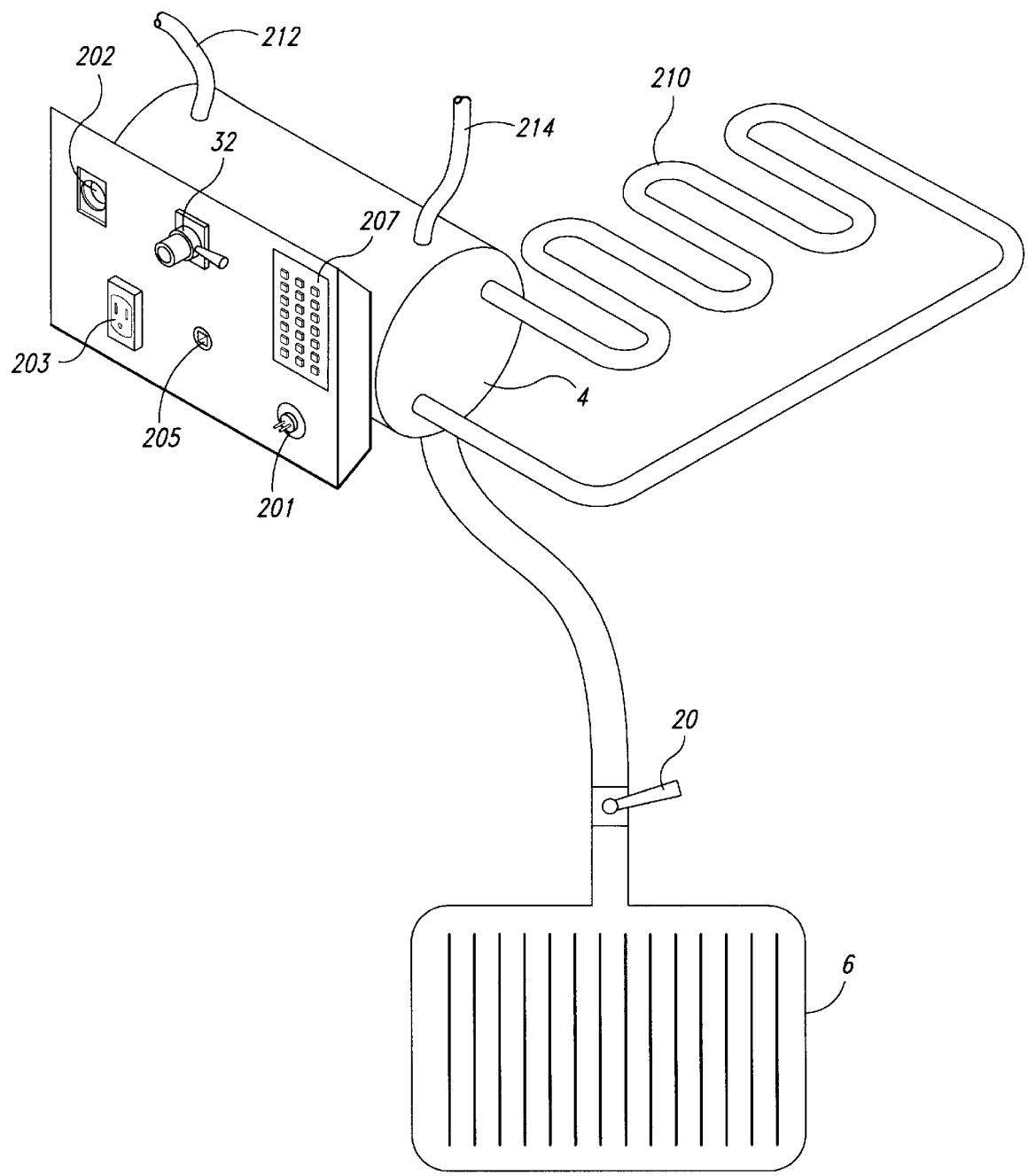
FIG. 11 is an embodiment of the present invention which includes both gas-fired and electric heat sources.

FIG. 11 illustrates an alternate embodiment of the present invention in which the adsorbent vessel may be heated by a gas burner assembly 201 which exhausts through gas port 202 or an electric heater element 203 or by hot gas or liquid which flows in through inlet port 212 and out through outlet port 214. The method of heating the adsorbent material 10 contained in the adsorbent vessel 4 may be chosen based on the availability of the heating source at the time of desorption. The inlet port 212 and outlet port 214 may be connected to any convenient heat source, such as a car radiator. A cooling heat exchanger 210 is also provided to reduce the temperature of the adsorbent vessel 4 once it has been desorbed. An entry port 205 is supplied to permit maintenance of the adsorbent vessel 4 and its controls 207. Vacuum port 32 is connectable to a vacuum source (not shown) for evacuation of the adsorbent vessel to pressures less than atmospheric pressure.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A heat transfer apparatus which uses a heat source to generate a cooling effect, the apparatus comprising:
a first vessel having a first aperture and containing an adsorbent material having an adsorbing capacity;
a second vessel having a second aperture, the second aperture connected to the first aperture of the first vessel with a conduit, the conduit providing a fluid passage between the vessels, the vessels and the conduit forming a sealed volume capable of maintaining less than atmospheric pressure therein; and
a quantity of working substance within the sealed volume, the quantity including a portion of working substance in the second vessel, the working substance being capable of being strongly adsorbed by the absorbent material, the adsorbing capacity of the adsorbent material being sufficient to adsorb by sublimation at least part of the portion of working substance in the second vessel when substantially the entire portion of working substance in the second vessel is in a solid state.

2. The heat transfer apparatus of claim 1, further comprising a valve positioned in the conduit and moveable between an open position with the working substance free to move between the first and second vessels and closed position with the working substance constrained from movement between the vessels.

3. The heat transfer apparatus of claim 2 wherein the valve is in the closed position and substantially all the working substance is retained by the adsorbent material.

4. The heat transfer apparatus of claim 1 wherein the second vessel has a third aperture therein, further comprising a third vessel connected to the third aperture, the third vessel having an adsorbent material and an adsorbent capacity, wherein the third vessel is capable of being heated by a heat source while the first vessel is adsorbing the working substance, and the first vessel is capable of being heated by the heat source while the third vessel is adsorbing the working substance.

5. The heat transfer apparatus of claim 1 wherein the second vessel is a refrigeration element for cooling a volume surrounding the second vessel.

6. The heat transfer apparatus of claim 1 wherein the quantity of working substance is not greater than the adsorbing capacity of the adsorbent material at a selected temperature and pressure of the sealed volume such that the working substance is capable of being substantially completely adsorbed by the adsorbent material.

7. The heat transfer apparatus of claim 1 wherein the sealed unit has an internal absolute pressure of 4 mm of mercury.

8. The heat transfer apparatus of claim 1 wherein the adsorbent material has a weight and the working substance has a weight that is 28.5% of the adsorbent material weight.

9. The heat transfer apparatus of claim 1, further comprising a heat source positioned proximate to the adsorbent material for heating the adsorbent material and evaporating the working substance therefrom, the heat source being controllable between an active state wherein the heat source heats the adsorbent material and an inactive state.

10. The heat transfer apparatus of claim 9 wherein the heat source is positioned external to the first vessel.

11. The heat transfer apparatus of claim 9 wherein the heat source is positioned within the first vessel.

12. The heat transfer apparatus of claim 11 wherein the heat source is thermally coupled to the adsorbent material.

13. The heat transfer apparatus of claim 11 wherein the heat source is bonded to the adsorbent material.

14. The heat transfer apparatus of claim 9 wherein the first vessel is capable of achieving a temperature of approximately 70° F. when the heat source is in its inactive state.

15. The heat transfer apparatus of claim 9 wherein the heat source is heated by solar energy.

16. The heat transfer apparatus of claim 1 wherein the adsorbent material is a zeolite.

17. The heat transfer apparatus of claim 1 wherein the working substance is water.

18. The heat transfer apparatus of claim 1 wherein the working substance is a first adsorbate, further comprising a second adsorbate, the first adsorbate being adsorbed by the adsorbent at a slower rate than a rate at which the second adsorbate is adsorbed by the adsorbent.

19. The heat transfer apparatus of claim 18 wherein the first adsorbate is water and the second adsorbate is carbon dioxide.

20. The heat transfer apparatus of claim 1 wherein the adsorbent is a first adsorbent and the working substance is a first adsorbate, further comprising a second adsorbent and a second adsorbate, the first adsorbate being adsorbed by the first adsorbent at a rate different than a rate at which the second adsorbate is adsorbed by the second adsorbent.

21. The heat transfer apparatus of claim 1 wherein the second vessel has a burst pressure limit, further comprising compressible material positioned within the second vessel, the compressible material compressible by the working substance as it changes from a liquid state to a solid state between an uncompressed volume and a smaller compressed volume, the compressible material and working substance exerting a selected pressure on the container which is less than the burst pressure limit.

22. The heat transfer apparatus of claim 1 wherein the first vessel has a vacuum aperture therethrough and an internal pressure, further comprising a vacuum valve connected to the vacuum aperture, the vacuum valve connectable to a vacuum source and moveable between an open position with the vacuum source in fluid communication with the first vessel for reducing the internal pressure of the first vessel and a closed position with the first vessel sealed from the vacuum source.

23. The heat transfer apparatus of claim 1, further comprising a Stirling engine having an engine efficiency and operating between a hot reservoir and a cold reservoir wherein the second vessel is positioned to cool the cold reservoir, lowering a temperature at which the cold reservoir removes heat from the Stirling engine, and the first vessel is positioned to heat the hot reservoir, thereby increasing the engine efficiency relative to a Stirling engine lacking the heat transfer apparatus.

24. The heat transfer apparatus of claim 1, further comprising a thermal voltaic device having a hot side and a cold side and a voltage output wherein the second vessel is positioned to cool the cold side, and the first vessel is positioned to heat the hot side thereby increasing the voltage output relative to a voltage device lacking the heat transfer apparatus.

25. The heat transfer apparatus of claim 1, further comprising a turbine device positioned in the conduit between the first and second vessels, the turbine device having a turbine rotor capable of converting linear motion of the working substance as it is adsorbed by the adsorbent material from the second vessel to the first vessel to rotational motion and transferring energy associated with the rotational motion outside the conduit.

26. The heat transfer apparatus of claim 1 wherein the first and second vessels, conduit and working substance define a first refrigeration unit, further comprising at least a second refrigeration unit, the second vessels of the refrigeration units being contained within a refrigeration chamber defining a refrigerated volume, the refrigeration units being controllable to maintain the refrigerated volume at a selected temperature.

27. The heat transfer apparatus of claim 1 wherein the first vessel has an interior area and the conduit has a perforated portion projecting into the interior area, the perforated portion having a plurality of perforations of a selected size, for passage of the working substance between the adsorbent and the conduit.

28. The heat transfer apparatus of claim 27, further comprising a mesh layer positioned between the perforated portion and the adsorbent, the mesh layer having a plurality of openings, the openings having a size that is smaller than the selected size of the perforations of the perforated portion of the conduit to prevent the adsorbent material from entering the perforations.

29. The heat transfer apparatus of claim 1, further comprising a refrigerator chamber defining an interior area having a temperature, wherein the second vessel is positioned within the interior area of the refrigerator chamber, the conduit passes through an aperture in the refrigerator chamber, and the first vessel is positioned outside the interior area, the heat transfer apparatus capable of lowering the temperature of the interior area below a temperature outside the interior area.

30. The heat transfer apparatus of claim 1 wherein the second vessel is a length of tubing.

31. The heat transfer apparatus of claim 1, further comprising a plurality of fins projecting outwardly from an exterior surface of the second vessel.

32. The heat transfer apparatus of claim 1 wherein the quantity of working substance is approximately equal to the adsorbing capacity of the adsorbent material.

33. The heat transfer apparatus of claim 1, further comprising a heat transfer source for transferring heat between the adsorbent material and a region outside the first vessel, the heat transfer source being in thermal contact with the adsorbent material.

34. The heat transfer apparatus of claim 33 wherein the heat transfer source is a water jacket surrounding the adsorbent material.

35. The heat transfer apparatus of claim 33 wherein the heat transfer source is positioned within the first vessel.

36. The heat transfer apparatus of claim 33 wherein the heat transfer source is capable of cooling the adsorbent material.

37. The heat transfer apparatus of claim 33 wherein the heat transfer source is capable of heating the adsorbent material.

38. A method for transferring heat and a working substance between a first vessel containing an adsorbent material and a second vessel connected to the first vessel, the two vessels defining a sealed volume containing a working substance in a liquid phase, the method comprising:

allowing a portion of the working substance to vaporize by adsorption and transfer from the second vessel to the adsorptive material in the first vessel, thereby causing a remaining portion of the working substance to freeze, creating a frozen working substance; and continuing to adsorb the frozen working substance by sublimation from the second vessel to the adsorptive material in the first vessel.

39. The method of claim 38, further comprising continuing to adsorb the frozen working substance by sublimation from the second vessel to the adsorptive material in the first vessel until the frozen working substance is substantially completely adsorbed by the adsorbent material.

40. The method of claim 38, further comprising:

heating the adsorbent to drive the working substance in a vapor state from the adsorbent to the second vessel; and condensing the working substance from a vapor state to a liquid state in the second vessel.

* * * * *